(12) United States Patent
Xie et al.

(10) Patent No.: US 10,810,484 B2
(45) Date of Patent: *Oct. 20, 2020

(54) HARDWARE ACCELERATOR FOR COMPRESSED GRU ON FPGA

(71) Applicant: BEIJING DEEPHI INTELLIGENCE TECHNOLOGY CO., LTD., Beijing (CN)

(72) Inventors: Dongliang Xie, Beijing (CN); Song Han, Beijing (CN); Yi Shan, Beijing (CN)

(73) Assignee: XILINX, INC., San Jose, CA (US)

( * ) Notice: Subject to any disclaimer, the term of this patent is extended or adjusted under 35 U.S.C. 154(b) by 548 days.

This patent is subject to a terminal disclaimer.

(21) Appl. No.: 15/390,744

(22) Filed: Dec. 27, 2016

(65) Prior Publication Data

US 2018/0046901 A1 Feb. 15, 2018

Related U.S. Application Data

(63) Continuation-in-part of application No. 15/242,622, filed on Aug. 22, 2016, now Pat. No. 10,621,486.
(Continued)

(30) Foreign Application Priority Data

Aug. 12, 2016 (CN) .......................... 2016 1 0663175
Aug. 12, 2016 (CN) .......................... 2016 1 0663201
(Continued)

(51) Int. Cl.
*G06N 3/04* (2006.01)
*G06N 3/063* (2006.01)
(Continued)

(52) U.S. Cl.
CPC ............. *G06N 3/0445* (2013.01); *G06F 7/50* (2013.01); *G06F 7/523* (2013.01); *G06F 7/5443* (2013.01);
(Continued)

(58) Field of Classification Search
CPC ...... G06N 3/0445; G06N 3/063; G06N 3/082; G06N 3/04; G06F 7/50; G06F 7/523; G06F 7/5443; G06F 2207/4824
See application file for complete search history.

(56) References Cited

U.S. PATENT DOCUMENTS 9,317,482 B2 4/2016 Davis et al.
2016/0379109 A1* 12/2016 Chung ..................... G06N 3/04
706/26

FOREIGN PATENT DOCUMENTS

CN 102129397 A 7/2011
CN 104915322 A 9/2015
(Continued)

OTHER PUBLICATIONS

Han, "EIE:Efficient Inference Engine on Compress Deep Neural Network", IEEE, p. 243-254 (Year: 2016).*
(Continued)

*Primary Examiner* — Eric Nilsson
*Assistant Examiner* — Van C Mang
(74) *Attorney, Agent, or Firm* — IPro, PLLC

(57) ABSTRACT

The present technical disclosure relates to artificial neural networks, e.g., gated recurrent unit (GRU). In particular, the present technical disclosure relates to how to implement a hardware accelerator for compressed GRU based on an embedded FPGA. Specifically, it proposes an overall design processing method of matrix decoding, matrix-vector multiplication, vector accumulation and activation function. In another aspect, the present technical disclosure proposes an
(Continued)

overall hardware design to implement and accelerate the above process.

15 Claims, 10 Drawing Sheets

Related U.S. Application Data which is a continuation-in-part of application No. 15/242,624, filed on Aug. 22, 2016, which is a continuation-in-part of application No. 15/242,625, filed on Aug. 22, 2016.

(30) Foreign Application Priority Data

Aug. 12, 2016 (CN) .......................... 2016 1 0663563
Dec. 5, 2016 (CN) .......................... 2016 1 1105597

(51) Int. Cl.
*G06N 3/08* (2006.01)
*G06F 7/50* (2006.01)
*G06F 7/523* (2006.01)
*G06F 7/544* (2006.01)

(52) U.S. Cl.
CPC ............. *G06N 3/063* (2013.01); *G06N 3/082* (2013.01); *G06F 2207/4824* (2013.01)

(56) References Cited

FOREIGN PATENT DOCUMENTS

| CN | 105488565 A | 4/2016 |
|---|---|---|
| CN | 205139973 U | 4/2016 |
| CN | 105681628 A | 6/2016 |
| CN | 105760933 A | 7/2016 |

OTHER PUBLICATIONS

Qiu, "Going Deeper with Embedded FPGA Platform for Convolutional Neural Network", 2016 (Year: 2016).*
Qiu, "Going Deeper with Embedded FPGA platform for Convolutional Neural Network" (Year: 2016).*
Han, "EIE: Efficient Inference Engine on Compress Deep Neural Network", IEE, p. 243-254 (Year: 2016).*
Chung "Gated Feedback recurrent Neural Networks", 2015 (Year: 2015).*
Chang, "Recurrent Neural Networks Hardware Implementation on FPGA", Purdue University 2016 (Year: 2016).*
Wang, "DLAU: Scalable Deep Learning Accelerator Unit on FPGA" IEEE, p. 513-517 (Year: 2016).*
Wang, "DLAU: A Scalable Deep Learning Accelerator Unit on FPGA" IEEE, 513-517 (Year: 2016).*
Zhang, "Optimization FPGA-based Accelerator Design for Deep Convolutional Neural Networks", ACM New York, 2015 (Year: 2016).*
Zhang, "Optimization FPGA-based Accelerator Design for Deep Convolutional Neural Networks" ACM New York, 2015 (Year: 2015).*
Junyoung Chung "Empirical Evaluation of Gated Recurrent Neural Networks on Sequence Modeling", 2014 (Year: 2014).*
ESE: Efficient Speech Recognition Engine with Compressed LSTM on FPGA, arXiv:1612.00694v1 [cs.CL] Dec. 1, 2016.
Going Deeper with Embedded FPGA Platform for Convolutional Neural Network, DOI: 10.1145/2847263.2847265.
1. Image-Net Large-Scale Vision Recognition Challenge (ILSVRC) 2012.
15. Long short-term memory recurrent neural network architectures for large scale acoustic modeling[C]//INTERSPEECH. 2014: 338-342.
16. Long short-term memory based recurrent neural network architectures for large vocabulary speech recognition[J]. arXiv preprint arXiv:1402.1128, 2014.
18. Deep compression: Compressing deep neural networks with pruning, trained quantization and Huffman coding.
19. Diannao: A small-footprint high-throughput accelerator for ubiquitous machine-learning.
21. Dadiannao: A machine-learning supercomputer.
22. Shidiannao: shifting vision processing closer to the sensor.
23. DSD: Regularizing Deep Neural Networks with Dense-Sparse-Dense Training Flow in NIPS 2016.
Gated Feedback Recurrent Neural Networks, Proceedings of the 32nd International Conference on Machine Learning, Lille, France, 2015. JMLR: WandCP vol. 37.
Learning both Weights and Connections for Efficient Neural Networks, arXiv:1506.02626v3 [cs.NE] Oct. 30, 2015.
2. Reconfigurable pipelined 2-d convolvers for fast digital signal processing.
Recurrent Neural Networks Hardware Implementation on FPGA, arXiv:1511.05552v4 [cs.NE] Mar. 4, 2016.
12. A dynamically configurable coprocessor for convolutional neural networks.
3. Second order derivatives for network pruning: Optimal brain surgeon.
EIE: Efficient Inference Engine on Compressed Deep Neural Network, arXiv:1602.01528v2 [cs.CV] May 3, 2016.
5. Cnp: An fpga-based processor for convolutional networks.
6. Optimizing fpga-based accelerator design for deep convolutional neural networks.
7. Pudiannao: A polyvalent machine learning accelerator.
8. DSD: Regularizing Deep Neural Networks with Dense-Sparse-Dense Training Flow in NIPS 2016.
9. Long Short-term Memory, Neural Computation 9(8):1735-80 • Dec. 1997, DOI: 10.1162/neco.1997.9.8.1735.
A Massively Parallel Coprocessor for Convolutional Neural Networks, DOI: 10.1109/ASAP.2009.25.
NeuFlow: Dataflow vision processing system-on-a-chip, DOI: 10.1109/MWSCAS.2012.6292202.

* cited by examiner

| Virtual Weight | $W_{0,0}$ | $W_{8,0}$ | $W_{12,0}$ | $W_{4,1}$ | $W_{0,2}$ | $W_{12,2}$ | $W_{0,4}$ | $W_{4,4}$ | $W_{0,5}$ | $W_{12,5}$ | $W_{0,6}$ | $W_{8,7}$ | $W_{12,7}$ |
|---|---|---|---|---|---|---|---|---|---|---|---|---|---|
| Relative Row Index | 0 | 1 | 0 | 1 | 0 | 2 | 0 | 0 | 0 | 2 | 0 | 2 | 0 |
| Column Pointer | 0 | 3 | 4 | 6 | 6 | 8 | 10 | 11 | 13 | | | | |

| Data Fetch | Sigmoid /Tanh | $W_x$ | $U_h$ | $W_x$ | $U_h$ | | $W_x$ | $U_h$ | |
|---|---|---|---|---|---|---|---|---|---|
| | | P | P | P | P | | P | P | |
| | | X | | X | | | X | | |
| Computation | | | $W_xX_t$ | $U_hh_{t-1}$ | $W_xX_t$ | | $U_hh_{t-1}$ | $W_xX_t$ | |
| | | | | | $z_t$ \| $r_t$ \| $r_t*Uh_{t-1}$ \| $\sim h_t$ \| $h_t$ | | | $z_t$ \| $r_t$ \| $r_t*Uh_{t-1}$ \| $\sim h_t$ \| $h_t$ | |
| STATE | INITIAL | STATE_1 | STATE_2 | STATE_1 | | STATE_2 | | STATE_1 | |

Fig. 12

| Weight values | W₀₀ | W₂₀ | W₄₁ | W₆₂ | W₄₃ | W₀₄ | W₂₄ | W₄₅ | W₂₆ |
|---|---|---|---|---|---|---|---|---|---|
| Relative Index | 0 | 0 | 4 | 4 | 2 | 1 | 0 | 4 | 2 |
| Column Pointer | 0 | 2 | 3 | 4 | 5 | 7 | 8 | 9 | 9 |

Fig. 13

HARDWARE ACCELERATOR FOR COMPRESSED GRU ON FPGA

CROSS REFERENCE TO RELATED APPLICATIONS

This application claims priority to Chinese Patent Application Number 201610663201.9 filed on Aug. 12, 2016 and Chinese Patent Application Number 201610663563.8 filed on Aug. 12, 2016, Chinese Patent Application Number 201610663175.X filed on Aug. 12, 2016, Chinese Patent Application Number 201611105597.1 filed on Dec. 5, 2016, U.S. application Ser. No. 15/242,622 filed on Aug. 22, 2016, U.S. application Ser. No. 15/242,624 filed on Aug. 22, 2016, U.S. application Ser. No. 15/242,625 filed on Aug. 22, 2016, the entire content of which are incorporated herein by reference.

TECHNICAL FIELD

The present technical disclosure relates to artificial neural networks, e.g., gated recurrent unit (GRU). In particular, the present technical disclosure relates to how to implement a hardware accelerator for compressed GRU based on an embedded FPGA.

BACKGROUND ART

Introduction to RNN

Recurrent Neural Network (RNN) is a class of artificial neural network where connections between units form an oriented loop. This creates an internal state of the network which allows it to exhibit dynamic temporal behavior. RNNs can handle the variable-length sequence by having a recurrent hidden state whose activation at each time is dependent on that of the previous time.

Traditionally, the standard RNN computes hidden layer at next step as:

$$h_t = f(W^{(hh)} h_{t-1} + W^{(hx)} x_t)$$

where f is a smooth, bounded function, such as a logistic sigmoid function or a hyperbolic tangent function. $W^{(hh)}$ is the state-to-state recurrent weight matrix, and $W^{(hx)}$ is the input-to-hidden weight matrix.

Input sequence is $x=(x_1, \ldots, x_T)$. We can divide the probability of a sequence of arbitrary length into:

$$p(x_1, \ldots, x_T) = p(x_1) p(x_2|x_1) p(x_3|x_1, x_2) \ldots p(x_T|x_1, \ldots, x_{T-1})$$

Then, as shown in FIG. 1, we can train an RNN to model this probability distribution, and predict the probability of the next symbol $x_{t+1}$, given that hidden states $h_t$ is a function of all the previous symbols $x_1, x_2, \ldots x_t$.

$$p(x_{t+1}|x_1, \ldots, x_t) = f(h_t)$$

The hidden layer activations are computed by iterating the following equations from t=1 to T and from n=2 to N:

$$h_t^1 = \mathcal{H}(W_{ih^1} x_t + W_{h^1 h^1} h_{t-1}^1 + b_h^1)$$

$$h_t^n = \mathcal{H}(W_{ih^n} x_t + W_{h^{n-1} h^n} h_t^{n-1} + W_{h^n h^n} h_{t-1}^n + b_h^n)$$

where the W terms denote weight matrices (e.g. $W_{ih^n}$ is the weight matrix applied to the inputs to the $n^{th}$ hidden layer, $W_{h^1 h^1}$ is the recurrent weight matrix at the first hidden layer, and so on), the b terms denote bias vectors (e.g. $b_y$ is output bias vector) and H is the hidden layer function.

Given the hidden sequences, the output sequence is computed as follows:

$$\hat{y}_t = b_y + \sum_{n=1}^{N} W_{h^n y} h_t^n$$

$$y_t = y(\hat{y}_t)$$

where y is the output layer function. The complete network therefore defines a function, parameterized by the weight matrices, from input histories x 1:t to output vectors $y_t$.

FIG. 2 shows a simplified basic network frame of RNNs, wherein the output of the previous hidden layer is the input of the present hidden layer. That is, the output of the present layer is related to both the hidden layer of the previous layer and the input of the present layer.

GRU

Gated recurrent unit (GRU) is a type of RNN. GRU can adaptively remember and forget its state based on the input signal to the unit.

FIG. 3 shows the graphical illustration of the GRU.

The reset signal at reset gate $r_t$ is computed by $$r_t = \sigma(W^{(r)} x_t + U^{(r)} h_{t-1})$$

where $W^{(r)}$ is the reset gate's weight matrix being applied to inputs, and $U^{(r)}$ is the reset gate's weigh matrix being applied to hidden layers.

the update signal at update gate is computed similarly to the reset gate:

$$z_t = \sigma(W^{(z)} x_t + U^{(z)} h_{t-1})$$

where $W^{(z)}$ is the reset gate's weight matrix being applied to inputs, and $U^{(z)}$ is the reset gate's weigh matrix being applied to hidden layers.

The candidate activation $\tilde{h}_t$ is computed similarly to the traditional recurrent unit.

$$\tilde{h}_t = \tanh(W x_t + r_t \odot U h_{t-1})$$

where W is the transformation matrix being applied to inputs and U is the transformation matrix being applied to hidden layers.

If reset gate unit is a vector only zero elements, then this ignores previous memory and only stores the new word information.

The activation $h_t$ of the GRU at time t is a linear interpolation between previous activation and the candidate activation.

$$h_t = z_t \odot h_{t-1} + (1 - z_t) \odot \tilde{h}_t$$

Compression of Neural Networks

In recent years, the scale of neural networks is exploding. Advanced neural network models might have billions of connections and the implementation thereof is both calculation-centric and memory-centric.

The conventional solutions typically use a general purpose CPU or GPU (graphic processing unit) to realize related algorithms. However, it is not clear how much potential can be further developed in the processing capabilities of conventional chips like CPU and GPU, as Moore's Law might fail one day. Thus, it is of critical importance to compress neural networks into smaller scale neural networks so as to reduce computation and memory consumption.

On the other hand, customized circuit can solve the above-mentioned problem, so that the customized processor can achieve better acceleration ratio in implementing a sparse neural network model.

One purpose of the present technical disclosure is to provide a customized hardware accelerator with a parallelized pipeline design. The hardware accelerator is especially suitable for sparse neural networks, and can achieve better computation efficiency while reduce processing delay.

CRS and CCS

For a sparse matrix, which is typically obtained after being compressed, it is desired to encode the matrix in order to further reduce the memory requirements. It has been proposed to encode and store sparse matrix by Compressed Row Storage (CRS) or Compressed Column Storage (CCS).

In the present application, in order to exploit the sparsity of compressed neural networks, it might encode and store the sparse weight matrix W in a variation of compressed column storage (CCS) format.

For each column $W_j$ of matrix W, it stores a vector v that contains the non-zero weights, and a second, equal-length vector z. Vector z encodes the number of zeros before the corresponding entry in v. Each entry of v and z is represented by a four-bit value. If more than 15 zeros appear before a non-zero entry we add a zero in vector v.

For example, it encodes the following column [0,0,1,2,0, 0,0,0,0,0,0,0,0,0,0,0,0,0,0,0,0,3], as v=[1,2,0,3], z=[2,0, 15,2].

v and z of all columns are stored in one large pair of arrays with a pointer vector p pointing to the beginning of the vector for each column. A final entry in p points one beyond the last vector element so that the number of non-zeros in column j (including padded zeros) is given by $p_{j+1} - p_j$.

Storing the sparse matrix by CCS format makes it easy to exploit matrix sparsity. It simply multiplies each non-zero activation by all of the non-zero elements in its corresponding column.

For further details regarding the storage of a sparse matrix, please refer to U.S. Pat. No. 9,317,482, UNIVERSAL FPGA/ASIC MATRIX-VECTOR MULTIPLICATION ARCHITECTURE. In this patent, it proposes a sparse matrix representation, referred as the Compressed Variable Length Bit Vector (CVBV) format, which is used to take advantage of the capabilities of FPGAs and reduce storage and band width requirements across the matrices. Also, it discloses a class of sparse matrix formats that are better suited for FPGA implementations in reducing storage and bandwidth requirements. A partitioned CVBV format is described to enable parallel decoding.

The compressed neural network needs to be encoded for storage, and the encoded network needs to be decoded before computation.

However, the general purpose processor cannot fully take advantage of the sparsity of the compressed neural network. Experiment data has shown that acceleration ratio achieved by general purpose processor (CPU or GPU) is quite limited when compression ratio is relatively low.

Thus, we hope customized circuit can address above defects so that processor can achieve acceleration ratio even when the compression ratio is relatively low.

One purpose of the present technical disclosure is provide a type of GRU customized circuit using high parallelized pipeline, which can process sparse GRU neural network effectively and achieve better computational performance and reduce response delay.

SUMMARY

In the present technical disclosure, we propose a device for implementing compressed GRU (recurrent neural network), said device comprising: a receiving unit, which is used to receive a plurality of input vectors and distribute them to a plurality of processing elements (PE); a plurality of processing elements (PE), each of which comprising: a reading unit configured to read weight matrices W, said W indicates weights of said GRU; an ALU configured to perform multiplication and addition calculation of said weight matrices W; a calculation buffer configured to store results of matrix-vector multiplication and output results to an assembling unit; an assembling unit configured to receive results from PEs and assemble them into a complete resultant vector; a hidden layer computation module, configured to read matrix-vector multiplication result from said processing elements, and to compute update signal, reset signal and the hidden layer's activation output vector h; and a controller unit configured for controlling said plurality of processing elements.

Further, said hidden layer computation module comprising: an activation function unit, configured to perform hidden layer's activation function of said GRU; a selector, configured to receive data from said assembling unit and element-wise multiplier and select one of the received data to be output to an adder tree; a $W_x$ buffer, configured to receive and store matrix-vector multiplication results from the assembling unit and output corresponding result to the adder tree according to the instruction from the controller unit; an adder tree, configured to conduct vector accumulation operation on vectors received from the $W_x$ buffer and the selector; an element-wise multiplier, configured to conduct element-wise multiplication on vectors received from the assembling unit and the activation function unit, and to output the multiplication result to the selector.

Further, said receiving unit comprises: a plurality of first-in-first-out buffer, and each of which corresponds to a PE.

Further, said reading unit comprises: a location unit configured to read and store location information of non-zero elements in the weight matrix W; a decoding unit configured to decoding the weight matrix to obtain the weight value of the weight matrix W.

Further, said ALU comprises: a multiplier configured to perform multiplication operation on matrix elements and input vector elements; an adder configured to perform addition operation on the results of above multiplication operation.

Further, said calculation buffer comprises: a first output buffer and a second output buffer, said first and second buffer receive and output computation result alternatively, wherein while one buffer receives the present computation result, the other buffer outputs the previous computation result.

Further, said hidden layer computation module comprises: a $\tilde{h}$ buffer, configured to receive and store a candidate activation $\tilde{h}$ from the activation function unit, and to send the received candidate activation $\tilde{h}$ to a linear interpolation unit to compute a hidden layer activation h; a Z buffer, configured to receive and store a update signal Z, and to send the received update signal Z to the linear interpolation unit in order to compute a hidden layer activation h; a linear interpolation unit, configured to compute said hidden layer activation h by conducting linear interpolation operation on data received from the $\tilde{h}$ buffer, Z buffer and a vector buffer; and a vector buffer, configured to receive and store the layer activation h of respective hidden layers.

According to another aspect of the present technical disclosure, we propose a method for implementing compressed GRU based on FPGA, comprising: a) receiving data related to GRU computation, including input vector, bias vector and weight matrices; b) decoding the data received in step a) in order to obtain the real weights; c) conducting matrix computation by performing matrix-vector multiplication using FPGA on-chip processing elements; d) computing an update signal and a reset signal of GRU, by performing vector accumulating and activation function computing; e) computing a candidate hidden layer activation of GRU, by performing element-wise multiplication, addition and activation function computing on the reset signal and matrix computation results so as to obtain a candidate hidden layer activation of GRU; f) computing a hidden layer activation of GRU, by performing a linear interpolation operation on the candidate hidden layer activation, update signal and hidden layer activation applied to previous input vector; and iterating the above steps a), b), c), d), e), f) to obtain GRU's activation sequences and computing GRU's output on the basis of the GRU's activation sequences.

Further, said method comprises: distributing received data to a plurality of parallel processing elements (PE) after receiving data in step a); and assembling results from each PE to obtain a complete result vector of matrix-vector multiplication after computation in step c).

Further, in at least one of said steps a), b), c), providing a pair of ping-pong buffers in a FPGA on-chip memory.

According to another aspect of the present technical disclosure, we propose a method for implementing a Gated Recurrent Unit (GRU) network, wherein the weights of said GRU being characterized by $W_z$, $W_r$, W, $W_x$, $U_z$, $U_r$, U and $U_h$, where $W_z$ is the update gate's weight matrix being applied to inputs, $W_r$ is the reset gate's weight matrix being applied to inputs, W is the transformation matrix being applied to inputs, $W_x$ is a matrix combining $W_z$, $W_r$ and W, $U_z$ is the update gate's weigh matrix being applied to hidden layers, $U_r$ is the reset gate's weigh matrix being applied to hidden layers, U is the transformation matrix being applied to hidden layers, $U_h$ is a matrix combining $U_r$, U and $U_h$, where an activation to be applied to an input vector by said hidden layers is $h_t$, the input of said GRU is a series of input vectors $x=(x_1,x_2 \ldots, x_T)$, said method comprises: initialization step of reading necessary data for computing $W_xX$ into a FPGA on-chip memory; by processing elements of said FPGA, step 1 of computing $W_xX$, and reading necessary data for computing $U_hh_{t-1}$ into the FPGA on-chip memory, where $h_{t-1}$ is an activation to be applied to the previous input vector by the hidden layer; by processing elements of said FPGA, step 2 of computing $U_hh_{t-1}$ and reading necessary data for computing the next $W_xX$ into the FPGA on-chip memory; iteratively repeating said step 1 and step 2.

Further, in said method, each of said Step 1 and Step 2 further comprises: while computing matrix-vector multiplication for the present input vector, computing the update signal Z, reset signal R, candidate hidden layer activation h and hidden layer activation $h_t$.

Further, in said method, said initial step, step 1 and step 2 are processed sequentially; and said step 1 and step 2 are processed periodically.

BRIEF DESCRIPTION OF THE DRAWINGS

FIG. 12 shows an exemplary matrix computation in one embodiment of the present technical disclosure.

FIG. 13 shows how the matrix is stored at one processing element in the FIG. 11.

EMBODIMENTS OF THE INVENTION

Previous Research Product of the Inventors: Parallel Processing Neural Network by EIE One of the co-inventors of the present technical disclosure has proposed and disclosed an Efficient Inference Engine (EIE, Efficient Inference Engine on Compressed Deep Neural Network). For a better understanding of the present technical disclosure, the EIE solution is briefly introduced here.

Figure 1:
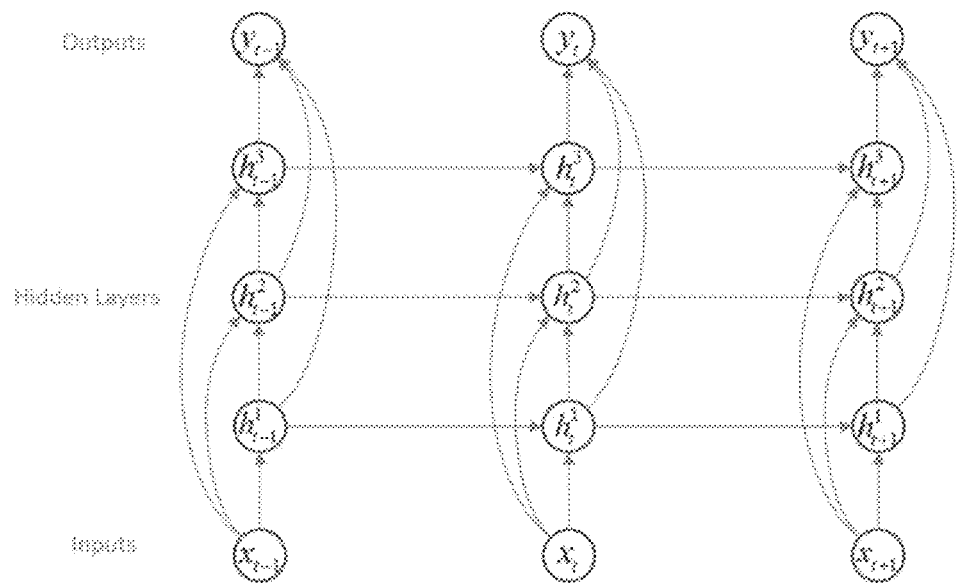
FIG. 1 shows an example of neural network comprising hidden layers.
Figure 2:
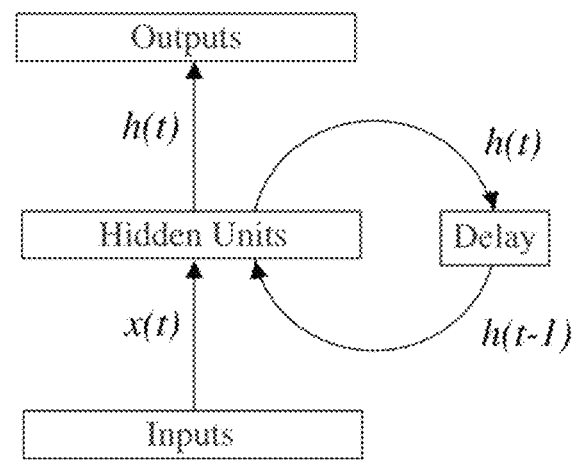
FIG. 2 shows an example of RNN model comprising hidden layers.
Figure 3:
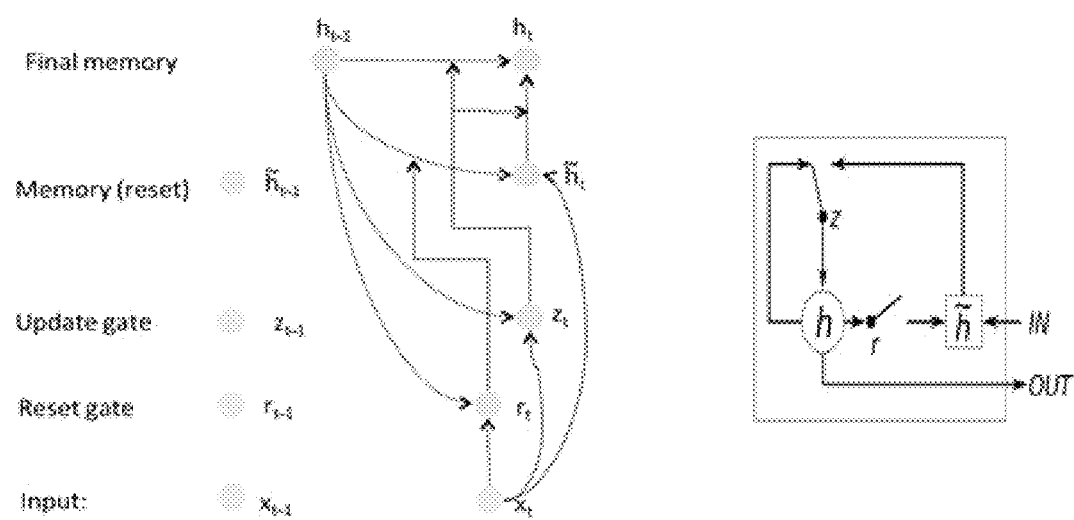
FIG. 3 shows an example of GRU model comprising hidden layers.
Figure 4:
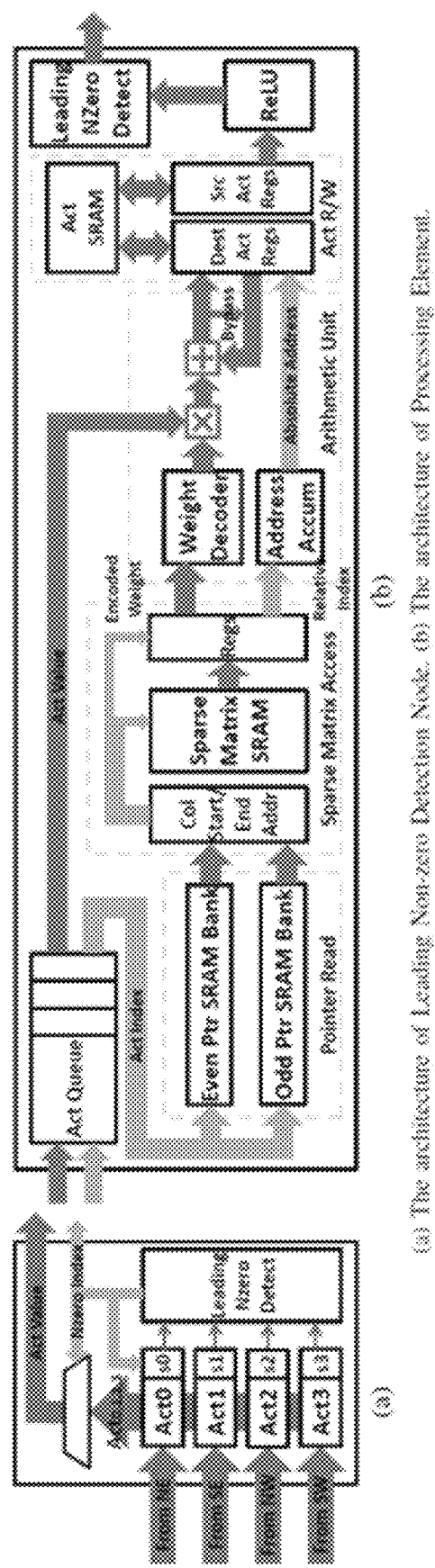
FIG. 4 shows an Efficient Inference Engine (EIE) used for implementing compressed neural network.

FIG. 4 shows the architecture of Efficient Inference Engine (EIE) that applies to compressed neural network model in machine learning, especially for the compressed neural network model stored in the above CCS or CRS format.

A Central Control Unit (CCU) controls an array of PEs that each computes one slice of the compressed network. The CCU also receives non-zero input activations from a distributed leading nonzero detection network and broadcasts these to the PEs.

Almost all computation in EIE is local to the PEs except for the collection of non-zero input activations that are broadcast to all PEs. However, the timing of the activation collection and broadcast is non-critical as most PEs take many cycles to consume each input activation.

Activation Queue and Load Balancing

Non-zero elements of the input activation vector $a_j$ and their corresponding index j are broadcast by the CCU to an activation queue in each PE. The broadcast is disabled if any PE has a full queue. At any point in time each PE processes the activation at the head of its queue.

The activation queue allows each PE to build up a backlog of work to even out load imbalance that may arise because the number of non-zeros in a given column j may vary from PE to PE.

Pointer Read Unit

The index j of the entry at the head of the activation queue is used to look up the start and end pointers $p_j$ and $p_{j+1}$ for the v and x arrays for column j. To allow both pointers to be read in one cycle using single-ported SRAM arrays, we store pointers in two SRAM banks and use the LSB of the address to select between banks. $p_j$ and $p_{j+1}$ will always be in different banks. EIE pointers are 16-bits in length.

Sparse Matrix Read Unit

The sparse-matrix read unit uses pointers $p_j$ and $p_{j+1}$ to read the non-zero elements (if any) of this PE's slice of column $I_j$ from the sparse-matrix SRAM. Each entry in the SRAM is 8-bits in length and contains one 4-bit element of v and one 4-bit element of x.

For efficiency the PE's slice of encoded sparse matrix I is stored in a 64-bit-wide SRAM. Thus eight entries are fetched on each SRAM read. The high 13 bits of the current pointer p selects an SRAM row, and the low 3-bits select one of the eight entries in that row. A single (v, x) entry is provided to the arithmetic unit each cycle.

Arithmetic Unit

The arithmetic unit receives a (v, x) entry from the sparse matrix read unit and performs the multiply accumulate operation $b_x = b_x + v \times a_j$. Index x is used to index an accumulator array (the destination activation registers) while v is multiplied by the activation value at the head of the activation queue. Because v is stored in 4-bit encoded form, it is first expanded to a 16-bit fixed-point number via a table look up. A bypass path is provided to route the output of the adder to its input if the same accumulator is selected on two adjacent cycles.

Activation Read/Write

The Activation Read/Write Unit contains two activation register files that accommodate the source and destination activation values respectively during a single round of FC layer computation. The source and destination register files exchange their role for next layer. Thus no additional data transfer is needed to support multilayer feed-forward computation.

Each activation register file holds 64 16-bit activations. This is sufficient to accommodate 4K activation vectors across 64 PEs. Longer activation vectors can be accommodated with the 2 KB activation SRAM. When the activation vector has a length greater than 4K, the M×V will be completed in several batches, where each batch is of length 4K or less. All the local reduction is done in the register, and SRAM is read only at the beginning and written at the end of the batch.

Distributed Leading Non-Zero Detection

Input activations are hierarchically distributed to each PE. To take advantage of the input vector sparsity, we use leading non-zero detection logic to select the first positive result. Each group of 4 PEs does a local leading non-zero detection on input activation. The result is sent to a Leading Non-Zero Detection Node (LNZD Node) illustrated in FIG. 4. Four of LNZD Nodes find the next non-zero activation and sends the result up the LNZD Node quadtree. That way the wiring would not increase as we add PEs. At the root LNZD Node, the positive activation is broadcast back to all the PEs via a separate wire placed in an H-tree.

Central Control Unit

The Central Control Unit (CCU) is the root LNZD Node. It communicates with the master such as CPU and monitors the state of every PE by setting the control registers. There are two modes in the Central Unit: I/O and Computing.

In the I/O mode, all of the PEs are idle while the activations and weights in every PE can be accessed by a DMA connected with the Central Unit.

In the Computing mode, the CCU will keep collecting and sending the values from source activation banks in sequential order until the input length is exceeded. By setting the input length and starting address of pointer array, EIE will be instructed to execute different layers.

Figures 5, 6:
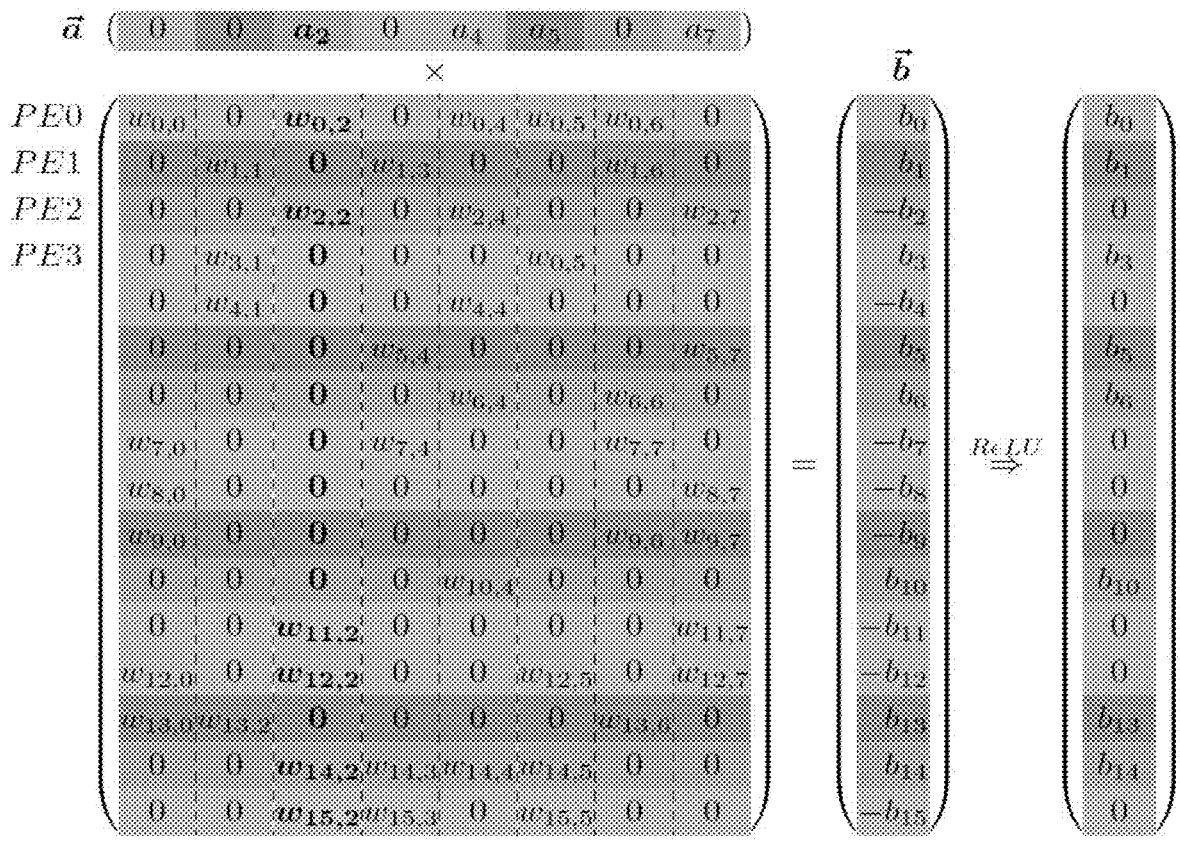
FIG. 5 shows how weight matrix W and input vectors a, b are distributed among a plurality of processing elements (PE) in the hardware according to FIG. 4.
FIG. 6 shows the CCS format matrix corresponding to a $PE_0$ in FIG. 5.

FIG. 5 shows how to distribute the matrix and parallelize matrix-vector computation by interleaving the rows of the matrix W over multiple processing elements (PEs).

With N PEs, $PE_k$ holds all rows $W_i$, output activations bi, and input activations $a_i$ for which i (mod N)=k. The portion of column $W_j$ in $PE_k$ is stored in the CCS format but with the zero counts referring only to zeros in the subset of the column in this PE. Each PE has its own v, x, and p arrays that encode its fraction of the sparse matrix.

In FIG. 5, Matrix W and vectors a and b are interleaved over 4 PEs. Elements of the same color are stored in the same PE.

In FIG. 5, it shows an example of multiplying an input activation vector a (of length 8) by a 16×8 weight matrix W yielding an output activation vector b (of length 16) on N=4 PEs. The elements of a, b, and W are color coded with their PE assignments. Each PE owns 4 rows of W, 2 elements of a, and 4 elements of b.

It performs the sparse matrix× sparse vector operation by scanning vector a to find its next non-zero value $a_j$ and broadcasting $a_j$ along with its index j to all PEs. Each PE then multiplies $a_j$ by the non-zero elements in its portion of column $W_j$—accumulating the partial sums in accumulators for each element of the output activation vector b. In the CCS representation, these non-zeros weights are stored contiguously so each PE simply walks through its v array from location $p_j$ to $p_{j+1}-1$ to load the weights. To address the output accumulators, the row number i corresponding to each weight $W_{ij}$ is generated by keeping a running sum of the entries of the x array.

In the example of FIG. 5, the first non-zero is $a_2$ on $PE_2$. The value $a_2$ and its column index 2 is broadcast to all PEs. Each PE then multiplies $a_2$ by every non-zero in its portion of column 2. $PE_0$ multiplies $a_2$ by $W_{0,2}$ and $W_{12,2}$; $PE_1$ has all zeros in column 2 and so performs no multiplications; $PE_2$ multiplies $a_2$ by $W_{2,2}$ and $W_{14,2}$, and so on. The result of each dot product is summed into the corresponding row accumulator. For example $PE_0$ computes $b_0 = b_0 + W_{0,2} a_2$ and $b_{12} = b_{12} + W_{12,2} a_2$. The accumulators are initialized to zero before each layer computation.

The interleaved CCS representation facilitates exploitation of both the dynamic sparsity of activation vector a and the static sparsity of the weight matrix W.

It exploits activation sparsity by broadcasting only non-zero elements of input activation a. Columns corresponding to zeros in vector a are completely skipped. The interleaved CCS representation allows each PE to quickly find the non-zeros in each column to be multiplied by $a_j$. This organization also keeps all of the computation except for the broadcast of the input activations local to a PE.

FIG. 6 shows the CCS representation of matrix in FIG. 5.

In particular, FIG. 6 shows the CCS format matrix to be processed by a $PE_0$ in FIG. 5.

The relative row index: it indicates the number of zero-value weights between the present non-zero weight and the previous non-zero weight.

The column pointer: the value by the present column pointer reducing the previous column pointer indicates the number of non-zero weights in this column.

Thus, by referring to the index and pointer of FIG. 6, the non-zero weights can be accessed in the following manner. (1) Reading two consecutive column pointers and obtain the reduction value, said reduction value is the number of non-zero weights in this column. (2) By referring to the row index, the row address of said non-zero weights can be obtained. In this way, both the row address and column address of a non-zero weight can be obtained.

In FIG. 6, the weights have been further encoded as virtual weights. In order to obtain the real weights, it is necessary to decode the virtual weights.

Figure 7:
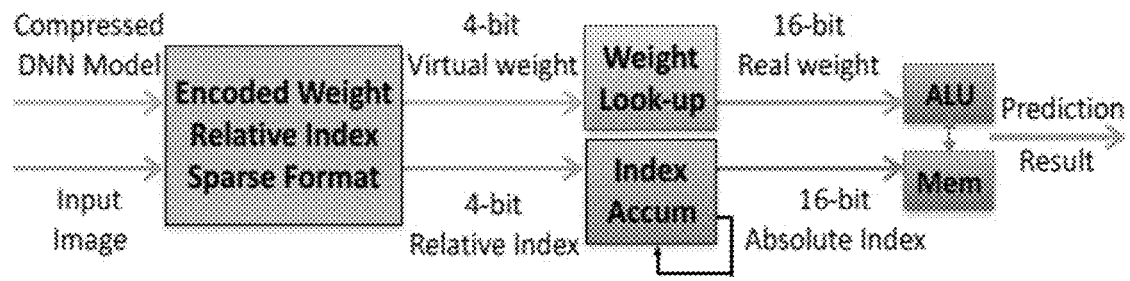
FIG. 7 shows a more detailed structure of the Weight Decoder shown in FIG. 4.

FIG. 7 shows more details of the weight decoder of the EIE solution shown in FIG. 4.

In FIG. 7, Weight Look-up and Index Accum correspond to the Weight Decoder in FIG. 4. By using said index, Weight Look-up, and a codebook, it decodes a virtual weight (e.g. 4-bit) to a real weight (16-bit).

With weight sharing, it is possible to store only a short (4-bit) index for each weight. Thus, in such a solution, the compressed DNN is indexed with a codebook to exploit its sparsity. It will be decoded from virtual weights to real weights before it is implemented in the proposed EIE hardware structure.

Further Improvement of the Present Technical Disclosure

In prior art, GRU algorithm is commonly implemented by a general purpose CPU or GRU. However, a dense GRU need relatively huge I/O bandwidth, storage and computation resources. It is not clear how much potential can be further developed in conventional CPU or GPU chips, as Moore's Law might eventually stop being valid.

In order to meet algorithm requirements and make GRU easier to be employed, neural network compression is becoming more and more popular.

The compressed neural network needs to be encoded for storage, and the encoded network needs to be decoded before computation.

However, the general purpose processor cannot fully take advantage of the sparsity of the compressed neural network. Experiment data has shown that acceleration ratio achieved by a general purpose processor (CPU or GPU) is quiet limited when compression ratio is relatively low.

Thus, one purpose of the present technical disclosure is to provide a device and a method for implementing a hardware accelerator for compressed GRU based on FPGA, so as to achieve better computational performance and reduce response delay.

In order to achieve the above mentioned purpose, the present technical disclosure proposes a customized circuit for the compressed GRU models, which involves a particular state machine for compressed GRU, ping-pong buffers and parallelized pipeline. These designs enable the present technical disclosure to balance I/O bandwidth and computational efficiency, achieving better performance with lower power consumption.

Compared to EIE, which accelerates a part of neural networks (that is, accelerates matrix-vector multiplication), the present technical disclosure further accelerates computation in the entire neural network, including not only matrix-vector multiplication but also vector accumulation (e.g., adder tree operations) and activation function operations.

Figure 8:
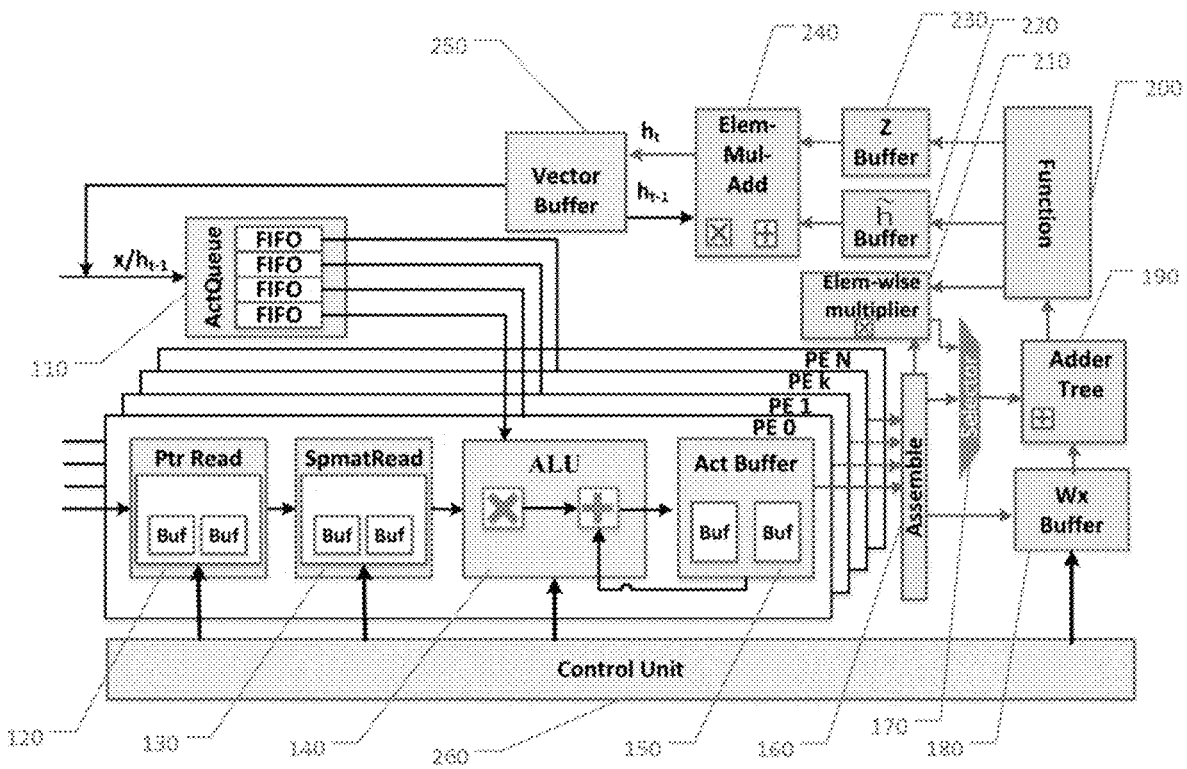
FIG. 8 shows the hardware layout of one embodiment with multiple processing elements (PEs) according to the present disclosure.

FIG. 8 shows the hardware layout of one embodiment of the present disclosure with multiple processing elements (PEs). It is composed of the following major modules:

ActQueue Unit 110: ActQueue Unit 110 receives and stores input vectors, and then sends them to ALU 140. Input vectors of ActQueue 110 include vector x in GRU's input sequence and hidden layer activation h.

Further, ActQueue Unit 110 may comprise several first-in-first-out buffers (FIFOs), each of which corresponds to one PE. The FIFOs are used to balance the computation workload across different PEs. The depth of the FIFOs can be decided according to experience. If the depth of the FIFOs is too large, it is a waste of resources. Meanwhile, if the depth of the FIFOs is too small, it cannot effectively balance the workload imbalance across different PEs.

A plurality of PEs might share input vectors.

As shown in FIG. 8, every PE further comprises following submodules:

PtrRead Unit 120: PtrRead Unit 120 reads and stores the pointers in the compressed neural network, and then outputs the pointers to SpmatRead Unit 130.

For example, if the compressed neural network is stored in CCS format, PtrRead Unit 120 will store column pointers (the third row in FIG. 5). Here, the index j of the first element $a_j$ in the ActQueue Unit 110 is used to look up the start pointers $P_j$ and the end pointer $P_{j+1}$ of the column. And the value of $P_{j+1}-P_j$ represents the number of non-zero elements in column j.

In one of the embodiments of the present disclosure, PtrRead Unit 110 includes a pair of ping-pong buffers.

SpmatRead Unit 130: SpmatRead Unit 130 reads and stores weight information of the compressed neural network and outputs them to ALU 140.

In one of the embodiments of the present disclosure, weight information includes relative index and weight value (the first two rows in FIG. 5).

In one of the embodiments of the present disclosure, information read and processing in SpmatRead Unit 130 are also performed by two ping-pong buffers.

SpatRead Unit 130 receives pointer $P_j$ and $P_{j+1}$ from PtrRead Unit 120, the corresponding weight value can be read according to the value of received pointers. Weight value in Column j can be loaded through moving the pointer from $P_j$ to $P_{j-1}-1$.

ALU 140: The ALU 140 receives relative index and weight from the SpmatRead Unit 130 and input vector elements from ActQueue Unit 110. ALU performs multiply-accumulate operation based on input data, and outputs the result to Act Buffer 150.

The computation in ALU 140 is operated in the following two steps. First, the element of input vector is multiplied by the weight value; Second, ALU reads the previous accumulated result stored in Act Buffer 150 according to the relative index and add this accumulated result to the result of the first step.

Act Buffer 150: Act Buffer 150 stores intermediate results as well as final results of computation in each PE. Act Buffer 150 outputs the intermediate results to ALU 140 and outputs final results to Assemble Unit 160.

Here, in order to improve computational efficiency, the buffers are also implemented as ping-pong buffers.

In one embodiment as shown in FIG. 8, a plurality of PEs share the following modules.

Assemble Unit 160: Assemble Unit 160 receives multiply-accumulation results from Act Buffer 150 of each PE and assembles them into a complete result. Assemble Unit 160 output corresponding part of result into Selector 170, $W_x$ Buffer 180 or Elem-wise Multiplier 210.

Due to the parallel design of the present disclosure, each PE will perform multiply-accumulation operation on a fraction of a weight matrix and output a part of the result vector. The Assemble Unit 160 is used for assembling those parts into a complete result vector.

Selector 170: Selector 170 receives data from assemble 160 and Element-wise Multiplier 210, and selects one of them as the data to be input to Adder Tree 190.

$W_x$ Buffer 180: $W_x$ buffer 180 receives and stores computation results $W_x X_t$ in State_1 from Assemble Unit 160, where $W_x$ is the matrix consists of update gate's weight matrix $W^{(z)}$, reset gate's weight matrix, $W^{(r)}$ and transformation matrix W.

Figures 9, 10A:
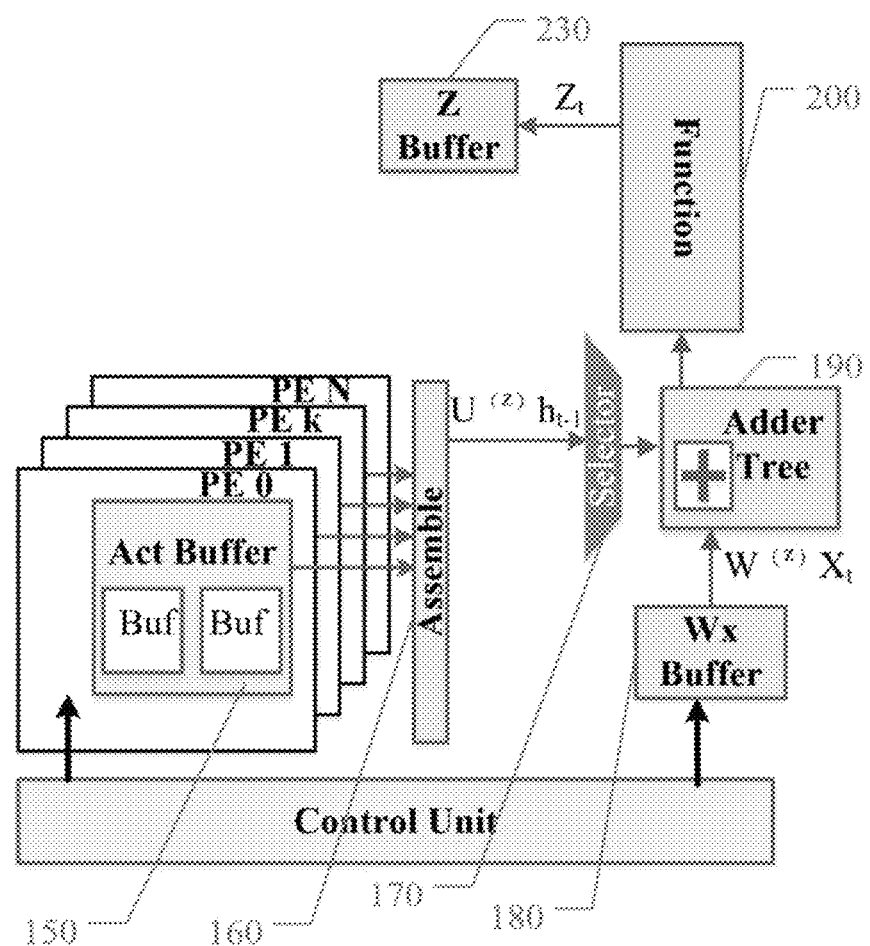
FIG. 9 shows a state machine and its state transition according to one embodiment of the present technical disclosure.
FIGS. 10a, 10b, 10c, 10d show how to compute hidden layer activation $h_t$ according to one embodiment of the present technical disclosure.

In the next State_1 (as shown in FIG. 9), $W_x$ Buffer outputs $W^{(z)}X_t$, $W^{(r)}$, $X_t$ or $WX_t$ to Adder Tree 190 to compute reset signal $r_t$, update signal $z_t$ or candidate activation $\tilde{h}_t$ respectively ((as shown in more details in FIGS. 10a, 10b and 10d)).

Adder Tree 190: Adder Tree 190 receives data from Selector 170 and Wx Buffer 180, (as shown in more details in FIGS. 10a, 10b and 10d) conducts accumulation operation on the received data, and outputs the addition result to Function Module 200.

Function Module 200: Function Module 200 is used for performing activation functions (such as sigmoid function or tanh function) in the algorithm (as shown in more details in FIGS. 10a, 10b and 10d). After Adder Tree 190 finished vector accumulation, this module 200 conducts activation function operation on the result and obtains $r_t$, $z_t$ or $\tilde{h}_t$.

Figure 10B:
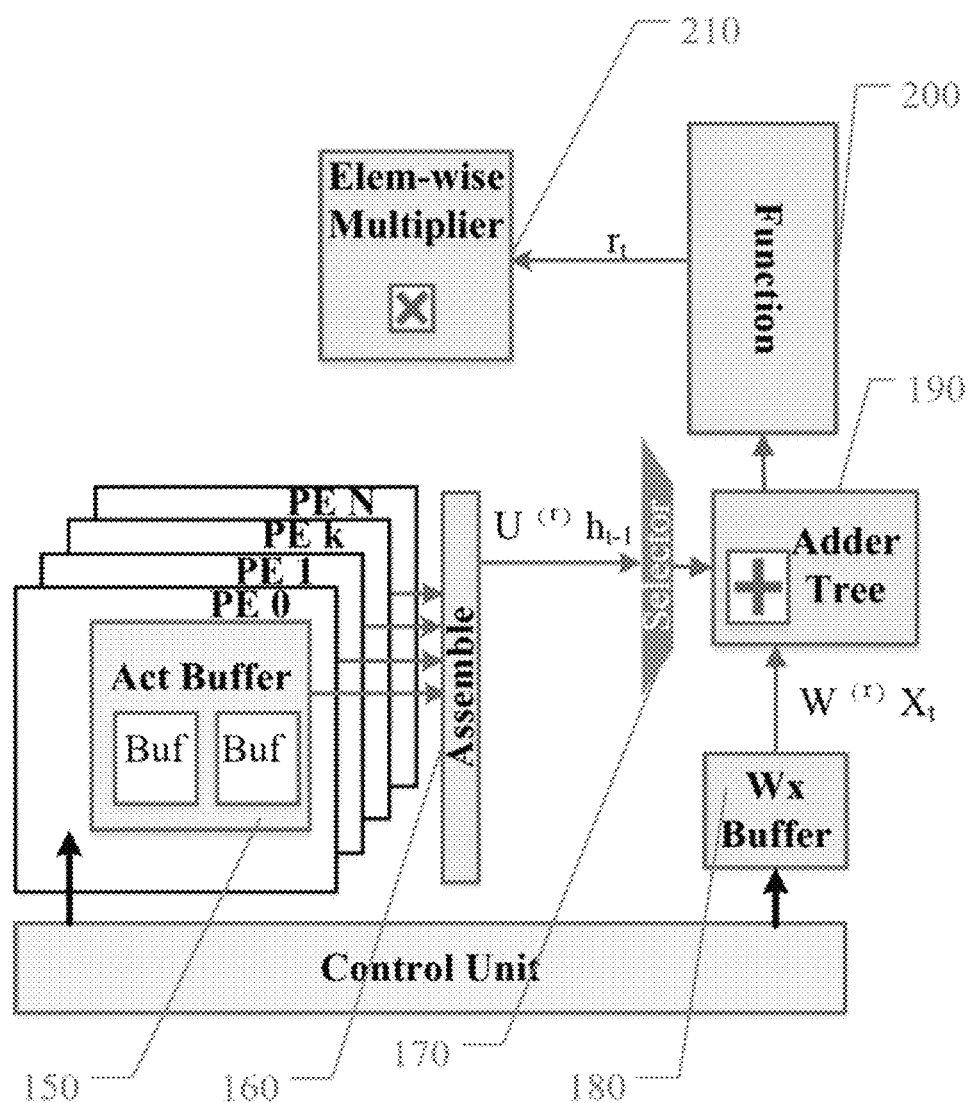
Figure 10C:
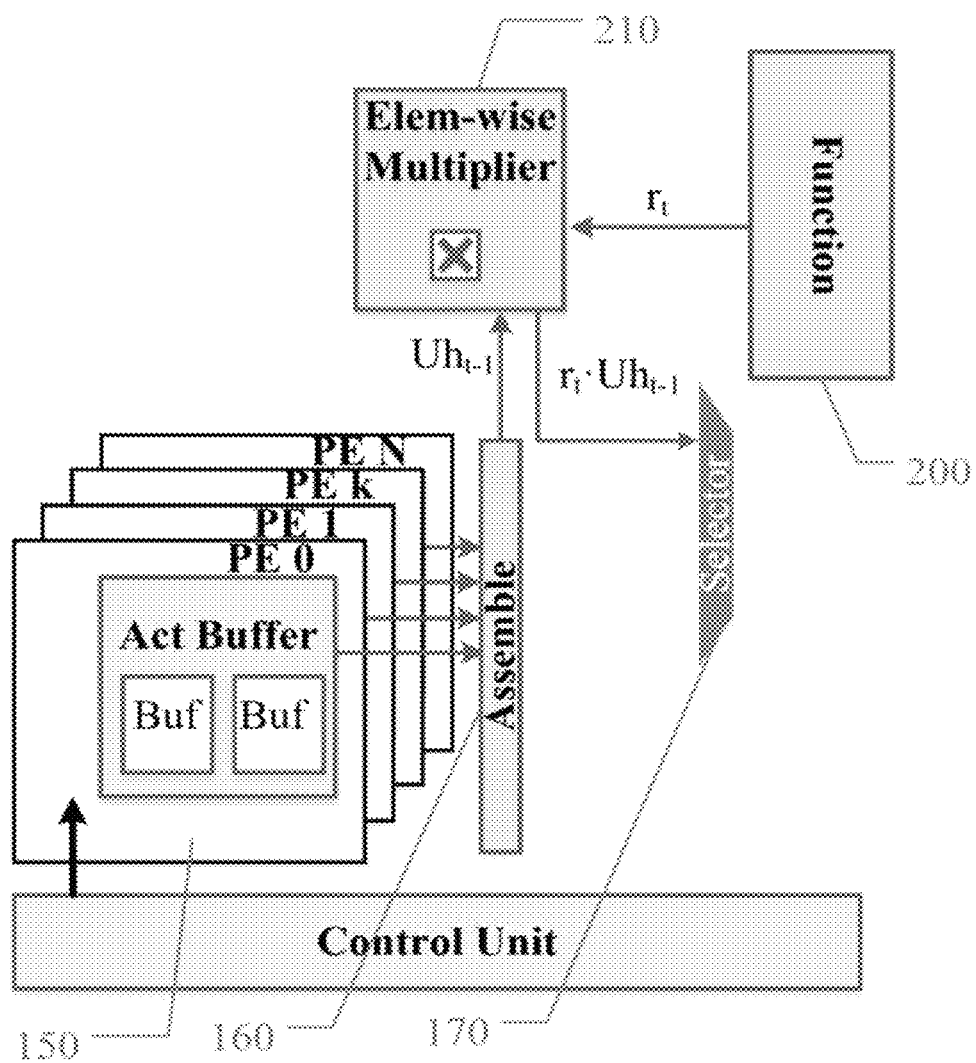
Figure 10D:
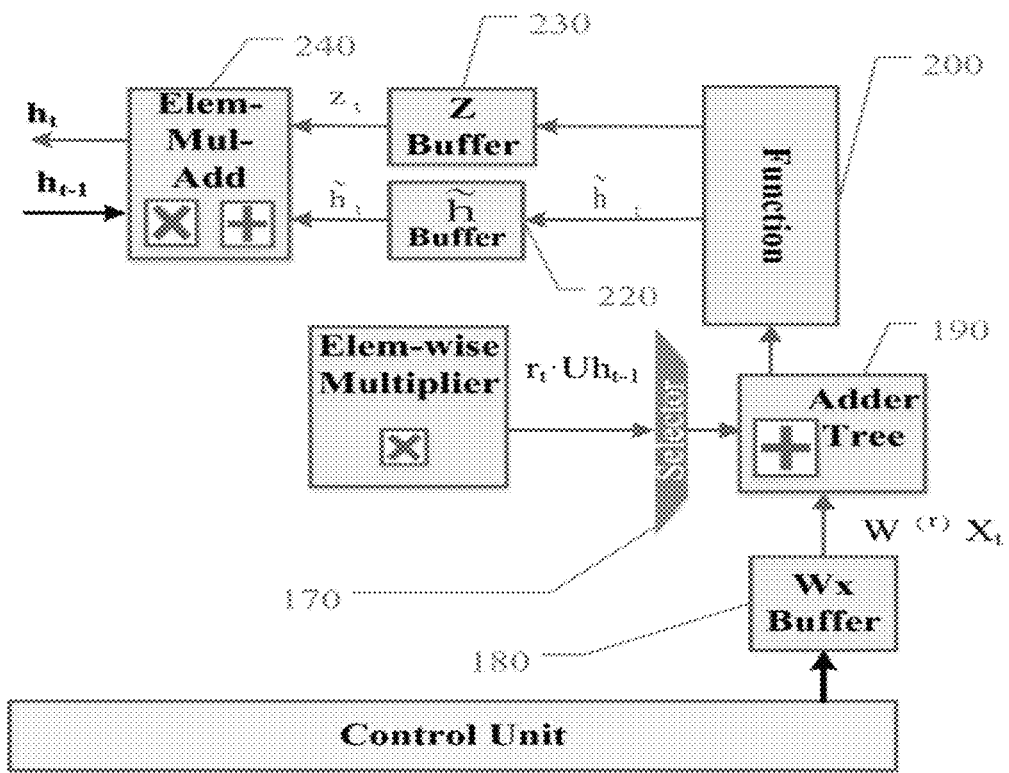

Elem-wise Multiplier 210: Elem-wise Multiplier 210 receives data from Assemble Unit 160 and Function Module 200, conducts element-wise multiplication on received data and outputs the result to Selector 170. More details is shown in FIG. 10c.

h̃ Buffer 220: As shown in FIG. 8, h̃ Buffer 220 is used to receive and store candidate hidden layer activation $\tilde{h}_t$ from Function Module 200, and outputs $\tilde{h}_t$ to Elem-Mul-Add Unit 240 to compute hidden layer activation $h_t$. More details is shown in FIG. 10d.

Z Buffer 230: As shown in FIG. 8, Z Buffer 230 is used to receive and store Zt from Function Module 200, and outputs $\tilde{h}_t$ to Elem-Mul-Add Unit 240 to compute hidden layer activation ht. More details is shown in FIG. 10a.

Elem-Mul-Add Unit 240: As shown in FIG. 8, Elem-Mul-Add Unit 240 receives $\tilde{h}_t$ from h̃ Buffer 220, $Z_t$ from Z Buffer 230 and $h_{t-1}$ from Vector Buffer 250, conducts element-wise multiplication and accumulation on the received vectors, and obtains the hidden layer activation $h_t$. is used to receive and store o Elem-Mul-Add Unit 240 to compute hidden layer activation $h_t$.

Vector Buffer 250: Vector Buffer 250 is used to store and output hidden layer activation computation result of each layer.

Control Unit 260: Control Unit 260 is used for global control. For example, it schedules workload into a plurality of PEs and co-ordinate various modules' interaction.

Further, the present technical disclosure designs a state machine. The GRU operation is performed through the state transition of the state machine.

As shown in FIG. 9, the state machine's control scope includes: reading pointers, synchronizing vector reading with weight matrix reading, switching of Ping-Pong buffers, computation in ALU 140, operation of calculation units and buffers provided outside PEs.

In one embodiment according to this technical disclosure, the multiplication on the same vector is combined as one. Specifically, in the following Equations, $W^{(z)}$, $W^{(r)}$ and W need to be multiplied by $X_t$, and $U^{(z)}$, $U^{(r)}$ and U need to be multiplied by $h_{t-1}$. In this embodiment, $W^{(z)}$, $W^{(r)}$ and W are combined as $W_x$, and $W_x$ is multiplied by $X_t$, $U^{(z)}$, $U^{(r)}$ and U are combined as $U_h$, and $U_h$ is multiplied by $h_{t-1}$.

$$r_t = \sigma(W^{(r)}x_t + U^{(r)}h_{t-1})$$

$$z_t = \sigma(W^{(z)}x_t + U^{(z)}h_{t-1})$$

$$\tilde{h}_t = \tanh(Wx_t + r_t \circ Uh_{t-1})$$

In such an embodiment, $X_t$ and $h_{t-1}$ need to be load for only once to complete the computation in one layer, which increase the efficiency.

In the present technical disclosure, the parallelized pipeline design of the customized circuit is reflected in the control of the state machine. Pipeline design can effectively balance the I/O bandwidth and the computational efficiency for specific GRU models.

More specifically, if data uploading time is less than computational time, PE efficiency can be maximized. The relation between computational complexity of each PE and required I/O bandwidth can be expressed as follows:

$$\frac{\text{data\_size} \times \text{compress\_ratio} \times 2}{\text{PE\_num} \times 2 \times \text{freq\_PE}} \geq \frac{\text{data\_size} \times \text{compress\_ratio} \times \text{data\_bit}}{\text{ddr\_width} \times \text{freq\_ddr}}$$

wherein the expression to the left refers to computational complexity of each PE, and the expression to the right refers to the required I/O bandwidth. In the inequality, data_size denotes the size of weight matrix (usually M*N dimensions), compress_ratio denotes GRU's compression ratio, PE_num denotes the extent of parallelism of PEs, freq_PE denotes the clock frequency of PEs, data_bit denotes the bit-width of compressed weight matrix data, ddr_width denotes the width of memory interface, freq_ddr denotes the clock frequency of memory interface.

FIG. 9 shows the state transition of a state machine according to one embodiment of the present technical disclosure.

Specifically, each state involves data fetching and computation.

Operations in the first three lines of FIG. 9 are fetching weights, pointers, input vectors to prepare for the next computation.

Operations in the fourth line are matrix-vector multiplications, including multiplying $W_x$ (combined by $W^{(z)}$, $W^{(r)}$ and W) by $X_t$, and multiplying $U_h$ (combined by $U^{(z)}$, $U^{(r)}$ and U) by $h_{t-1}$.

Operations in the fifth line are computations involving accumulation and activation functions etc.

Operations in horizontal direction have to be executed sequentially, while those in vertical direction are executed concurrently.

In one embodiment of the present technical disclosure, the state machine includes three states.

In the initial State, it performs data initialization. That is, it prepares all the necessary data for computing $W_xX_t$, where $X_t$ is the input vector, and $W_x$ is the corresponding weight matrix. For example, if the matrix is stored in CCS format, pointers, relative indexes and weight values are prepared.

In State_1, PEs calculate $W_xX_t$, while reading $U_h$ (e.g., combination of $U^{(z)}$, $U^{(r)}$ and U) from the memory provided outside PEs. In the next State_1, it computes $z_t$, $r_t$, ($r_t \circ Uh_{t-1}$), $\tilde{h}_t$ and $h_t$;

In State_2, PEs calculate $U_hh_{t-1}$, while fetching the next input vector x, the corresponding $W_x$ and pointers from a memory provided outside PE, for example.

As shown in FIG. 9, State_1 and State_2 are conducted alternatingly.

Calculation of matrix-vector multiplication of current layer (the fourth row in FIG. 9) is performed in parallel with accumulation and activation function operation of the preceding layer (the fifth row in FIG. 9), so as to achieve efficient pipeline computation.

Initialization of input vector $X_t$ and $h_{t-1}$ is performed by ActQueue Unit 110, and initialization of $W_x$ and $U_h$ is performed by PrtRead Unit 120 and SpmatRead Unit 130.

In one of the embodiment of present technical disclosure, compressed GRU hardware accelerator is implemented by the above units in the following steps:

Step 1: this step involves initialization. More specifically, PtrRead Unit 120 reads location information of the weight matrix according to global control information;

Step 2: according to the location information obtained in Step 1, SpmatRead Unit 130 reads the location indexes and weight values of the sparse neural network;

Step 3: it broadcasts the input vectors to the PEs according to global control information;

Step 4: ALU 140 multiplies the weight value from SpmatRead Unit 130 by the corresponding element of input vector from ActQueue Unit 110 and obtains the intermediate result of matrix-vector multiplication. It stores the intermediate result in Act Buffer 150;

Step 5: ALU 140 reads the corresponding intermediate result in Act Buffer 150 according to the location index in Step 2, and adds this intermediate result with the result in Step 4;

Step 6: it outputs the result in Step 5 into Act Buffer 150 according to the location index in Step 2;

Step 7: it iterates Step 1-6 to compute $W_x X_t$ and $Uh_{t-1}$. Store the result of $W_x X_t$ into $W_x$ Buffer 180. As shown in FIG. 10a, after computing $U_h h_{t-1}$, the system reads $W^{(z)} X_t$ from $W_x$ Buffer 180, computes update signal $Z_t$ using $U_h h_{t-1}$ and $W^{(z)} X_t$, and stores $Z_t$ in $Z_t$ Buffer 230.

Step 8: It reads $W^{(r)} X_t$ from $W_x$ Buffer 180 and $U^{(r)} h_{t-1}$ from Act Buffer 150, computes $r_t$ using $W^{(r)} X_t$ and $U^{(r)} h_{t-1}$. $r_t$ is used for element-wise multiplication with $Uh_{t-1}$ from Act Buffer 150. More details are shown in FIG. 10b and FIG. 10c.

Step 9: $\tilde{h}_t$ is obtained by computation on $WX_t$ (from $W_x$ Buffer 180) and the element-wise multiplication result in Step 8. $\tilde{h}_t$ is stored in $\tilde{h}_t$ Buffer 220. More details are shown in FIG. 10d.

Step 10: Elem-Mul-Add Unit 240 computes hidden layer $h_t$ by conducting element-wise multiplication and accumulation on $\tilde{h}_t$ from $\tilde{h}_t$ Buffer 220 and $Z_t$ from $Z_t$ Buffer 230. More details are shown in FIG. 10d.

EXAMPLE 1

Now, an example is given to better illustrate the general work principle of computations conducted on the hardware acceleration of the present technical disclosure. In the example, 2 PEs ($PE_0$ and $PE_1$) are used to perform a matrix-vector multiplication, wherein the GRU is stored in CCS format.

The sparsity of the compressed matrix is imbalanced, leading to a low efficiency of computation resource.

Figure 11:
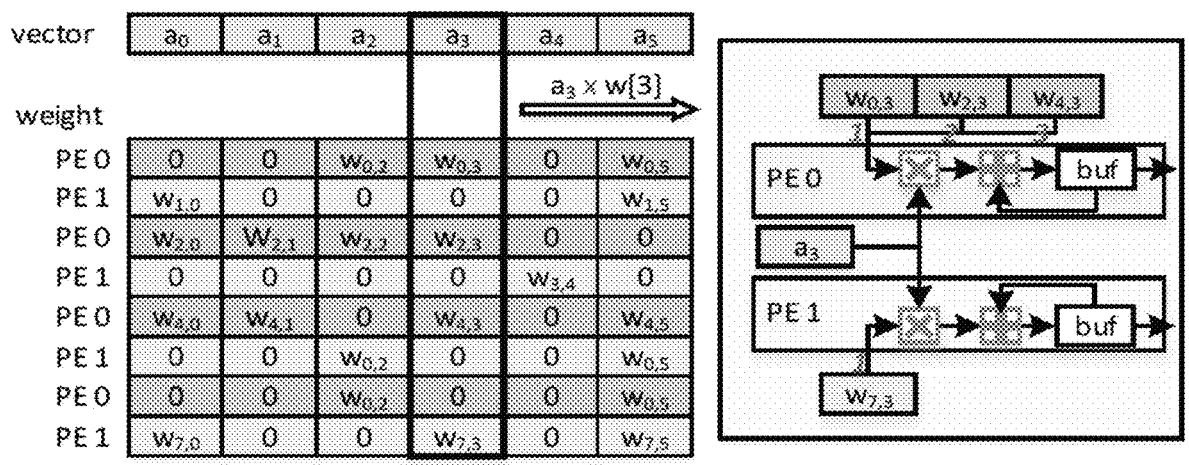
FIG. 11 shows how the efficiency is effected by the imbalanced sparsity in the matrix.

FIG. 11 shows how to compute the matrix W and input vector on the basis of the hardware design of the present technical disclosure.

As shown in FIG. 11, the input vector contains 6 elements $\{a_0, a_1, a_2, a_3, a_4, a_5, a_6\}$, and the weight matrix contains 8×6 elements. As there are 2 PEs to calculate $a_3 \times w[3]$, where $a3$ is the fourth element in the input vector and $w[3]$ represents the fourth column in the weight matrix.

As shown in FIG. 11, the workloads in PEs are different. $PE_0$ performs 3 multiply-add operations while $PE_1$ is required to take only 1 multiply-add.

Conventionally, after $PE_1$ finishes calculation on $a_3$, the system will keep it waiting until $PE_0$ finishes all the 3 calculation, then $PE_1$ continues to perform calculation on $a_4$.

In one embodiment of the present technical disclosure, however, the ActQueue Unit 110 contains first-in-first-out buffers (FIFO), which will load part of the input vector. In such embodiment, after finishing calculation on $a_3$, $PE_1$ will continue to read $a_4$ from FIFO and calculate on it. Such design will balance the sparsity of elements among PEs and increase the efficiency of computation resource.

As shown in FIG. 12, odd row elements are computed by $PE_0$, and even row elements are computed by $PE_1$. Odd elements of the result vector are computed by $PE_0$, and even elements of the result vector are computed by $PE_1$. The input vector is broadcasted to $PE_0$ and $PE_1$.

The operation in $PE_0$ is described as follows.

FIG. 13 shows the weight and corresponding relative index and column pointer in $PE_0$.

ActQueue Unit 110: it stores the input vector $x_t$. This module broadcasts the input vector to $PE_0$ and $PE_1$. Moreover, this module comprises several FIFOs to balance the load imbalance across the two PEs.

PtrRead Unit 120: it reads and stores the column position of the odd row non-zero elements, wherein the value of $P_{j-1} - P_j$ represents the number of non-zero elements in column j.

SpmatRead Unit 130: it reads and stores the weight value and the relative index of the odd row non-zero elements, for example $W_{00}$. And then it outputs $W_{00}$ to ALU 140 to calculation $W_{00} \cdot X_{00}$ and stores the result in Act Buffer 150. After this row's calculation has completed, Act Buffer 150 outputs the intermediate results ($W_{00} \cdot X_{00}$ and $W_{04} \cdot X_{04}$) to ALU 140 to calculate $Y_0$.

Assemble 160 assembles $Y_0, Y_2, Y_4, Y_6$ from $PE_0$ and $Y_1, Y_3, Y_5, Y_7$ from $PE_1$ to get the complete matrix-vector multiplication result Y.

Thus, it finishes calculation of one matrix-vector multiplication.

The output vector Y is used for vector accumulation and activation function operation to obtain a hidden layer activation h.

EXAMPLE 2

This example is used to illustrate how to achieve a balance between I/O bandwidth and PEs.

When the bandwidth of memory interface is 512-bit and its frequency is 250 Mhz, the weight data is 8-bit, PE's frequency is 200 MHz, the required extent of parallelism is PE_num≤ddr_width*freq_ddr/(freq_PE*data_bit)=512*250/200/8=80.

In a GRU network with 2048*1024 dimension weight matrix and 1024 dimension input vector, whatever sparsity is, matrix-vector multiplication is still the most time-consuming operation. In case of parallel operation, time consumption of $z_t$, $r_t$, and $h_t$ computation can be covered by $W_x X_t$ and $U_h h_{t-1}$ matrix-vector multiplication. Due to the pipeline design of successive element-wise multiplication and accumulation, the required resource is relatively little.

In conclusion, the present technical disclosure takes advantages of sparsity of weight matrix, balance between IO and computation, pipeline design, which can accelerate sparse GRU network algorithm efficiently.

Beneficial Technical Effects

Based on the above technical solution, the GRU acceleration device and method according to the present technical disclosure facilitates in obtaining a better balanced usage of the computational resources, storage resources and logic resources on the chip by means of a customized circuit involving ping-pong buffers and parallelized pipeline. Therefore, the device and method according to the present technical disclosure achieves better computation efficiency while reduces processing delay.

Moreover, those skilled in the art may understand and implement other variations to the disclosed embodiments from a study of the drawings, the present application, and the appended claims.

In the claims, the word "comprising" does not exclude other elements or steps, and the indefinite article "a" or "an" does not exclude a plurality.

In applications according to present application, one element may perform functions of several technical feature recited in claims.

Any reference signs in the claims should not be construed as limiting the scope. The scope and spirit of the present application is defined by the appended claims.

What is claimed is:

1. A device for implementing a compressed Gated Recurrent Unit (GRU), said device comprising:
    a receiving unit, which is used to receive a plurality of input vectors and distribute them to a plurality of processing elements (PE);
    the plurality of processing elements (PE), each of which comprising:
        an Arithmetic Logic Unit (ALU) configured to perform multiplication and addition calculation of a weight matrix W; and
        an act buffer configured to store results of matrix-vector multiplication;
    an assemble unit configured to receive results from the plurality of PEs and assemble the results into a complete resultant vector;
    a hidden layer computation circuitry, configured to read the results of matrix-vector multiplication from said plurality of processing elements, and to compute an update signal, a reset signal, and a hidden layer's activation output vector h; and
    a control unit configured for implementing a state machine to control said plurality of processing elements for the plurality of processing elements to work with the hidden layer computation circuitry in a parallelized pipeline in which calculation of matrix-vector multiplication of a current layer is performed by said plurality of processing elements in parallel with accumulation and activation function operation of a preceding layer performed by the hidden layer computation circuitry to achieve pipeline computation.

2. The device of claim 1, said hidden layer computation circuitry further comprising:
    a function module, configured to perform hidden layer's activation function of said GRU;
    a selector, configured to receive data from said assemble unit and element-wise multiplier and select one of the received data to be output to an adder tree;
    a $W_x$ buffer, configured to receive and store matrix-vector multiplication results from the assemble unit and output corresponding result to the adder tree according to the instruction from the control unit;
    an adder tree, configured to conduct vector accumulation operation on vectors received from the $W_x$ buffer and the selector;
    an element-wise multiplier, configured to conduct element-wise multiplication on vectors received from the assemble unit and the function module, and to output the multiplication result to the selector.

3. The device of claim 1, wherein said receiving unit further comprises:
    a plurality of first-in-first-out buffer, and each of which corresponds to a PE.

4. The device of claim 1, wherein each of the plurality of PEs further comprises:
    a pointer read unit configured to read pointer information of non-zero elements in the weight matrix W;
    a sparse matrix read unit configured to use the pointer information obtained by the pointer read unit to read weight values; and
    a weight decoder configured to decode a virtual weight to obtain a real weight of the weight matrix W.

5. The device of claim 1, wherein said ALU further comprises:
    a multiplier configured to perform a multiplication operation on matrix elements and input vector elements;
    an adder configured to perform addition operation on results of the multiplication operation.

6. The device of claim 1, wherein said act buffer further comprises:
    a first output buffer and a second output buffer, said first and second buffer receive and output computation result alternatingly, wherein while the first output buffer receives present computation result, the second output buffer outputs previous computation result.

7. The device of claim 1, wherein said hidden layer computation circuitry further comprises:
    a $\tilde{h}$ buffer, configured to receive and store a candidate activation $\tilde{h}$ from the function module, and to send the received candidate activation $\tilde{h}$ to a linear interpolation unit to compute a hidden layer activation h;
    a Z buffer, configured to receive and store a update signal Z, and to send the received update signal Z to the linear interpolation unit in order to compute a hidden layer activation h;
    a linear interpolation unit, configured to compute said hidden layer activation h by conducting linear interpolation operation on data received from the $\tilde{h}$ buffer, Z buffer and a vector buffer; and
    a vector buffer, configured to receive and store the layer activation h of respective hidden layers.

8. The device of claim 1, wherein the state machine includes: an initial state for preparing an input vector and a corresponding weight matrix; a first state_1 performing calculation of multiplication of the input vector to the corresponding weight matrix while reading $U_h$, $U_h$, being a matrix combining $U_r$, U and $U_h$, in which $U_z$ is an update gate's weight matrix being applied to hidden layers, $U_r$ is a reset gate's weight matrix being applied to the hidden layers, U is a transformation matrix being applied to the hidden layers, and a next state_1 performing calculation of an update signal Z, a reset signal R, a candidate hidden layer activation $\tilde{h}$ and a hidden layer activation h; and a state_2 performing $U_h h_{t-1}$, where $h_{t-1}$ is an activation to be applied to a previous input vector by the hidden layers.

9. A method for implementing a compressed Gated Recurrent Unit (GRU) based on a device, the method comprising:
    a) receiving data related to GRU computation, including an input vector, a bias vector and weight matrices;
    b) decoding the data received in step a) in order to obtain real weights;
    c) conducting matrix computation by performing matrix-vector multiplication using on-chip processing elements of the device;

d) computing an update signal and a reset signal of the GRU, by performing vector accumulating and activation function computing;
e) computing a candidate hidden layer activation of the GRU, by performing element-wise multiplication, addition, and activation function computing on the reset signal and results of the matrix computation;
f) computing a hidden layer activation of the GRU, by performing a linear interpolation operation on the candidate hidden layer activation, update signal, and hidden layer activation applied to a previous input vector; and
iterating the above steps a), b), c), d), e), f) to transition between three different states of a state machine to obtain the GRU's activation sequences and computing the GRU's output on the basis of the GRU's activation sequences in a parallelized pipeline in which calculation of matrix-vector multiplication of a current layer is performed by said on-chip processing elements of the device in parallel with accumulation and activation function operation of a preceding layer performed by the device to achieve pipeline computation.

10. The method of claim 9, further comprising:
distributing received data to the on-chip processing elements (PE) of the device after receiving data in step a); and
assembling results from each PE to obtain a complete result vector of matrix-vector multiplication after computation in step c).

11. The method of claim 9, in at least one of said steps a), b), c), providing a pair of ping-pong buffers in an on-chip memory of the device.

12. The method of claim 9, wherein the three different states of the state machine include an initial state, a state_1, and a state_2, wherein steps a) and b) are performed during the initial state; steps a), b), c) are performed during a first state_1; steps a), b), c), d), and e) are performed during a next state_1; and steps a), b), and f) are performed during the state_2.

13. A method for implementing a Gated Recurrent Unit (GRU) network, wherein weights of said GRU being characterized by $W_z$, $W_r$, $W$, $W_x$, $U_z$, $U_r$, $U$ and $U_h$, where: $W_z$ is an update gate's weight matrix being applied to inputs; $W_r$ is a reset gate's weight matrix being applied to the inputs; $W$ is a transformation matrix being applied to the inputs; $W_x$ is a matrix combining $W$, $W_r$ and $W$; $U_z$ is the update gate's weight matrix being applied to hidden layers; $U_r$ is the reset gate's weight matrix being applied to the hidden layers; $U$ is a transformation matrix being applied to the hidden layers; and Uh is a matrix combining $U_r$, $U$ and $U_z$, where an activation to be applied to an input vector by said hidden layers is $h_t$, and an input of said GRU is a series of input vectors $x=(x_1, x_2 \ldots, x_T)$, said method comprises:
an initialization step of reading data for computing $W_x X$ into an on-chip memory of a device;
by processing elements of said device, step 1 of computing $W_x X$, and reading data for computing $U_h h_{t-1}$ into the on-chip memory of the device, where $h_{t-1}$ is an activation to be applied to a previous input vector by the hidden layers;
by the processing elements of said device, step 2 of computing $U_h h_{t-1}$ and reading data for computing a next $W_x X$ into the on-chip memory of the device; and
iteratively and alternatingly repeating said step 1 and step 2, wherein the initialization step, step 1 and step 2 are three states of a state machine, and the three states are carried out in a parallelized pipeline in which calculation of matrix-vector multiplication of a current layer is performed by said processing elements of the device in parallel with accumulation and activation function operation of a preceding layer being performed by the device to achieve pipeline computation.

14. The method of claim 13, wherein each of said Step 1 and Step 2 further comprises:
while computing matrix-vector multiplication for a present input vector, computing the update signal Z, reset signal R, candidate hidden layer activation h̃ and hidden layer activation $h_t$ in a preceding layer to achieve pipeline computation.

15. The method of claim 14, wherein:
said initial step, step 1 and step 2 are processed sequentially.

* * * * *